United States Patent Office 2,733,131
Patented Jan. 31, 1956

2,733,131

PRODUCTION OF CUPROUS CYANIDE FROM ALKALINE MEDIUMS

Donald H. Rose, Lake Linden, and Gilbert H. Dawson, Calumet, Mich., assignors to Calumet & Hecla, Inc., a corporation of Michigan No Drawing. Application December 26, 1952, Serial No. 328,146

1 Claim. (Cl. 23—79)

This invention relates to the production of cuprous cyanide of a high degree of purity and stability from alkaline mediums. The process is particularly valuable in that it will produce cuprous cyanide of a high degree of purity from relatively impure raw materials.

Any copper bearing material may be used as a starting point, for example, metallic scrap from alloys, copper ores, copper compounds, or even pure copper. Metallic scrap is preferred because it leaches very rapidly in ammonium carbonate solutions.

The basic process comprises the treatment of an alkaline cuprous solution with cyanide ions in sufficient quantity to form a relatively pure and stable cuprous cyanide, followed by recovery of the cuprous cyanide in the resulting environment.

The production of the alkaline medium is preferably accomplished by leaching with an ammonia-ammonium carbonate solution followed by reduction of the copper in the solution to the cuprous state.

No claim is here made to the step of leaching, the ammonia-ammonium carbonate solution leaching of copper being well known and described, for example, in Patents 1,335,474 and 1,131,986. As an example of such processes, the copper bearing material is leached with an ammonia-ammonium carbonate solution containing 40–100 grams per liter of ammonia and 25–50 grams per liter of $CO_2$. During leaching, the solution is continuously recycled and oxidized by blowing oxygen containing gases through it. After the copper in the leach solution has built up to a concentration of not greater than 80 grams per liter, the oxidation is discontinued and reduction commenced.

The solution is extremely susceptible to oxygen and, therefore, the surface should be protected from any oxygen containing gases by using an inert gas blanket or completely filling all equipment with the solution so that no gas is present. The solution is then continuously recycled past copper bearing material until the copper is predominantly present in the cuprous form. It is preferred that the cuprous ion be at least 70% of the copper present by weight and in actual operations it is aimed to have about 90% or more of the copper in the cuprous form.

The addition of cyanide to the reduced solution may be carried out in a number of ways. In each case, however, sufficient cyanide is added to produce a substantially stable cuprous cyanide. Since any cupric ions present will destroy excess cyanide ions, it is important that the cupric ions be at a minimum and only the requisite amount of cyanide be added.

The preferred method of contacting the cuprous solution with cyanide is to utilize pellets or chunks of solid sodium cyanide. When so used, the process requires a minimum of cyanide ions as compared to the other processes. When the process is carried on in this manner, the cuprous solution is added to the pellets or chunks of solid sodium cyanide and a complex reaction occurs which results, however, in the formation of a white precipitate of a stable, substantially pure cuprous cyanide. The product is filtered and washed. It is then repulped by mixing in water, acidified with an acid such as sulfuric or hydrochloric but not sufficiently to produce any evolution of hydrogen cyanide, and is then refiltered.

Normally the process is operated by employing slightly more than one cyanide ion for each cuprous ion, the excess being merely sufficient to take care of any cupric ions which may be present.

If the process is carried on by the addition of sodium cyanide solution to the ammoniacal cuprous solution, a complex series of reactions occurs. A precipitate is formed immediately, but the color and form of this precipitate changes several times as more cyanide is added and ultimately a clear solution is formed.

The material is then acidified, preferably with a mineral acid to a pH at least as low as 5, but preferably not lower than 2. A pure white precipitate of substantially pure cuprous cyanide is formed. The precipitate is carefully washed free of acid, filtered and dried. The product is a very pure, white cuprous cyanide, which will retain its white color.

The ammonia solution may be re-used. The concentration of sodium, of course, builds up in it and after it has reached about 100 grams per liter, the ammonia may be separated by distillation and the sodium salts discarded.

If the ammoniacal solution of cuprous ions is added to a solution of sodium cyanide, a clear solution will be immediately formed. As more cuprous ions are added, a white precipitate starts to form and the process may be carried out in this manner if desired, the procedure beyond this stage being the same as when solid sodium cyanide is employed.

Described below is a typical run following the description of the process as outlined.

Two hundred pounds of copper scrap, containing 20% copper by weight, were put into a leaching tank of 100 gallon capacity. The tank was filled with an ammonia-ammonium carbonate solution analyzing 69.6 g./l. $NH_3$ and 44.6 g./l. $CO_2$. Air was blown into the bottom of the tank through an air diffuser and the solution recirculated. After two hours, the copper concentration had built up to 32 g./l., and the air was turned off. The solution recirculation was continued for another twelve hours, at which time the copper concentration was 44.9 g./l. and 94.3% reduced. The reduced solution was pumped into a precipitating tank containing 5.16 lbs. of commercial egg cyanide, guaranteed 90% pure. The cuprous cyanide solution was stirred for fifteen minutes, then filtered, washed and put back in the precipitating tank with 120 gallons of water. The pH of this slurry was adjusted to 2.5 with 2.08 liters of 66° Bé. sulfuric acid. After agitating for about fifteen minutes, the cuprous cyanide was again filtered, washed and dried. The product had a good white color and analyzed 70.0% Cu, 71.0% being theoretical. The recovery of the cyanide added was 97%.

While sodium cyanide is the cheapest available cyanide for the purpose, it is obvious that other compatible cyanides may be employed, including potassium cyanide and HCN.

The foregoing detailed description has been given for clearness of understanding only and no unnecessary limitations should be understood therefrom as modifications will be obvious to those skilled in the art.

We claim:

The method of making a substantially pure cuprous cyanide, comprising: leaching a copper-containing material with an aqueous solution of ammonia-ammonium carbonate while bubbling oxygen through said solution to produce an aqueous solution containing copper ions, the aqueous solution initially containing from about 40–100 grams per liter of ammonia and about 25–50 grams per liter of carbon dioxide; continuing said leaching and oxidizing until the copper content of the solution is not greater than about 80 grams per liter; reducing the copper ions in the solution by contacting said copper-containing material with said solution in the substantial absence of oxidizing agents until the copper content of the solution is at least 70% cuprous; adding to the solution a member of the class consisting of alkali metal cyanides and hydrocyanic acid to precipitate cuprous cyanide; separating the cuprous cyanide from the solution; washing the cuprous cyanide with water; mixing the cuprous cyanide with a weak aqueous acid solution having a pH of about 2–5; separating the solid cuprous cyanide from the acid solution; washing said cuprous cyanide; and drying.

References Cited in the file of this patent

UNITED STATES PATENTS 2,049,358    Dangelmajer _____ July 28, 1936

FOREIGN PATENTS 639,158    Germany _____ Nov. 30, 1936